United States Patent [19]
Teeters, Sr. et al.

[11] 3,936,589
[45] Feb. 3, 1976

[54] ELECTRIC SERVICE PANEL FOR UNDERGROUND SERVICE INSTALLATIONS HAVING ADJUSTABLE CONDUIT ATTACHING MEANS

[76] Inventors: Darrel L. Teeters, Sr., P. O. Box 401; Garey D. Teeters, 35213 Date St., both of, Yucaipa, Calif. 92399

[22] Filed: June 21, 1974

[21] Appl. No.: 481,767

[52] U.S. Cl. .................. 174/65 R; 174/38; 248/56; 285/64; 285/158; 285/192
[51] Int. Cl.² ..................................... H02G 3/06
[58] Field of Search ....... 174/38, 48, 49, 57, 61–64, 174/65 R; 317/104, 109, 110, 111; 220/3.7; 248/56, 57; 285/64, 128, 129, 158, 161, 192, 193

[56] References Cited
UNITED STATES PATENTS

| | | | |
|---|---|---|---|
| 1,581,571 | 4/1926 | Frederickson | 285/64 |
| 1,839,250 | 1/1932 | Newman et al. | 174/61 |
| 2,496,520 | 2/1950 | Daniel | 248/56 X |
| 2,628,799 | 2/1953 | Aaby | 248/57 |
| 2,950,837 | 8/1960 | Christensen et al. | 285/129 X |
| 2,991,943 | 7/1961 | Mullett et al. | 285/193 X |

*Primary Examiner*—Laramie E. Askin
*Attorney, Agent, or Firm*—Shoemaker and Mattare

[57] ABSTRACT

An electric service panel for underground service installations, wherein the electrical cable for supplying electrical power to the service panel leads to the service panel from below ground, said service panel having an elongate opening in a bottom wall portion thereof and a cable attaching adapter at the opening. The adapter can be laterally adjusted relative to the bottom wall and secured in adjusted position to thereby permit the point of entry of the cable into the service panel to be adjusted to compensate for misalignments between the cable and the service panel.

1 Claim, 5 Drawing Figures

U.S. Patent  February 3, 1976  3,936,589
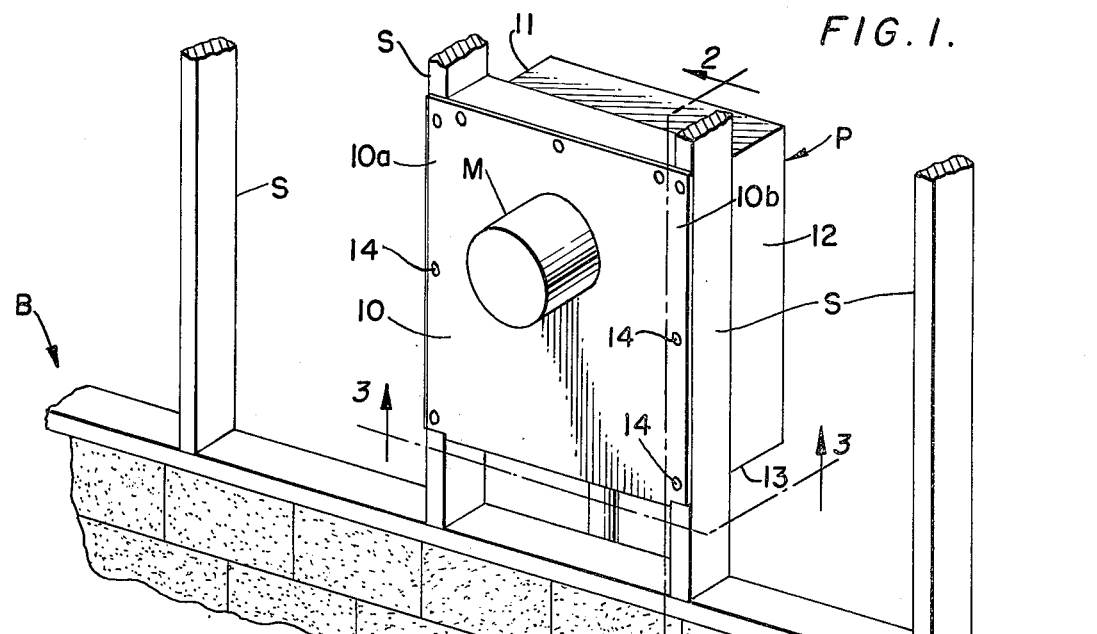
FIG. 1.
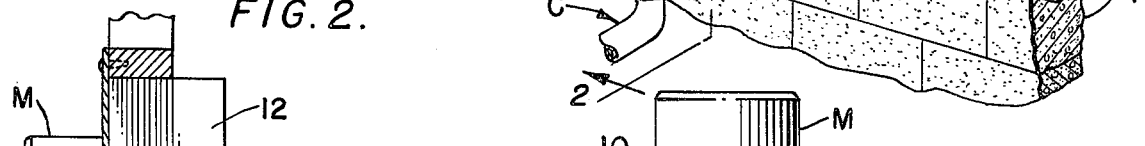
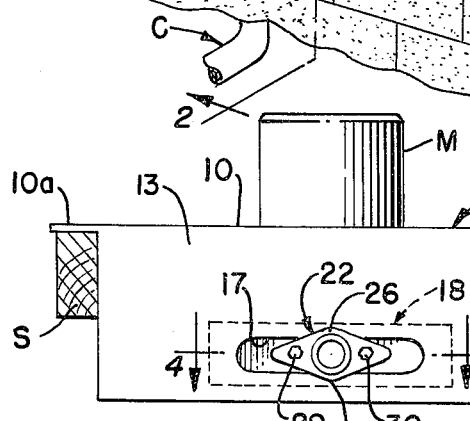
FIG. 2.
FIG. 3.
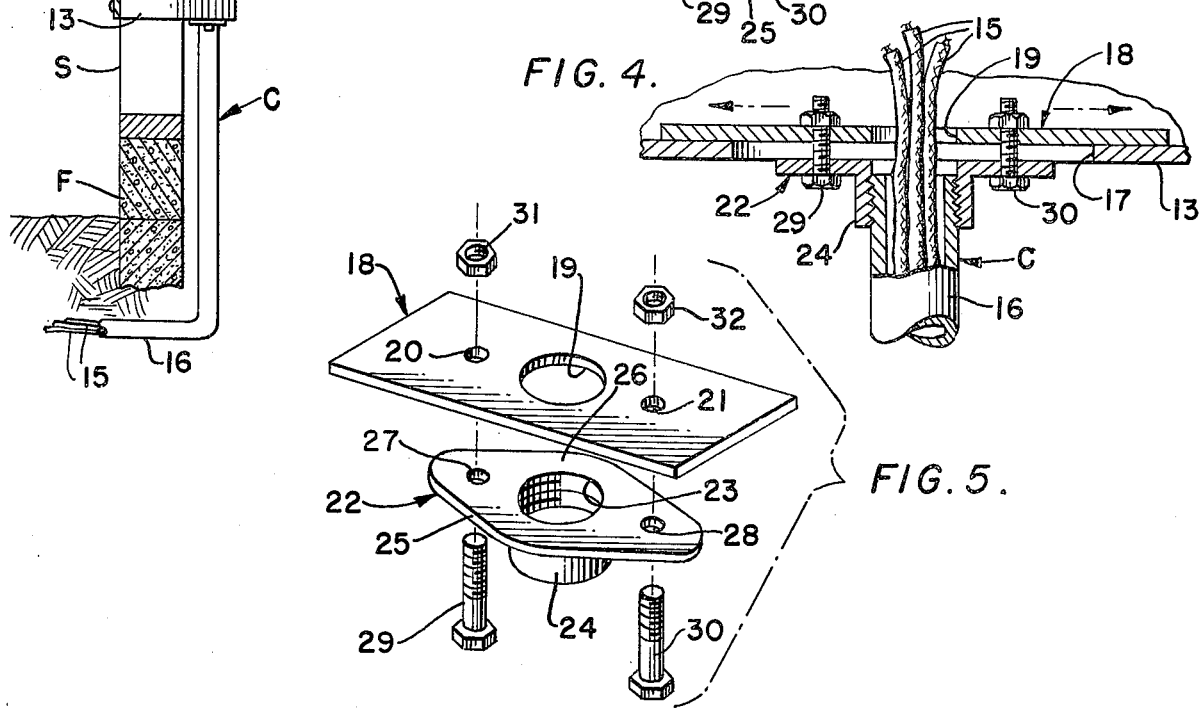
FIG. 4.
FIG. 5.

3,936,589

ELECTRIC SERVICE PANEL FOR UNDERGROUND SERVICE INSTALLATIONS HAVING ADJUSTABLE CONDUIT ATTACHING MEANS

BACKGROUND OF THE INVENTION

This invention relates to electric service panels for connecting a source of electrical energy with a plurality of service lines in a dwelling or other building.

More particularly, the present invention relates to an electric service panel for use with underground service installations wherein an electrical cable for supplying electric power to the service panel leads to the service panel from below ground.

The electric service panel is typically connected to studs or other framing of the building in a predetermined location, and when underground service is provided for the building, the electric power supply cable or cables extend through a rigid conduit of metal or plastic or the like, and the conduit is placed in the ground and rises vertically at one end from the ground and extends to the service panel. Frequently such cables extend through concrete (the foundation and wall, or the like, of a building) and, accordingly, if the relative positions of the service panel and the cable containing conduit are not precisely aligned when installed, the cable and conduit must be deflected or bent in order to properly align them with the service panel. This is extremely difficult to do, since the condiuts are rigid and require considerable effort to bend or deform them to make the necessary alignment with the service panel. Accordingly, when misalignment between the conduit and service panel occurs, considerable time and effort is required in order to properly align the conduit and service panel, and often the conduit and cable or cables therein are not properly aligned, with the result that an unsatisfactory strain or stress is imposed on the conduit and cable or on the service panel, or on both.

In accordance with the present invention, the service panel is provided with a unique conduit attaching means in the bottom wall thereof, whereby the opening through the bottom wall of the service panel may be moved laterally to accommodate the opening to the conduit and a cable or cables contained therein, thus eliminating the necessity of bending or deforming the conduit itself.

More specifically, in accordance with the present invention, the bottom wall of the service panel has an elongate opening therein and conduit attaching means are provided on the bottom wall in association with the opening, whereby the conduit attaching means may be laterally adjusted relative to the service panel to compensate for any misalignment between the service panel and conduit. Thus, the conduit and service panel may be quickly and easily aligned without requiring any force or effort to bend or otherwise move the conduit, and there is no likelihood of imposing undesirable stresses on the conduit, or service panel, or cable, such as might occur if the conduit is forced to one side or the other and then connected to the service panel. The attaching means according to the invention includes an adapter plate inside the service panel in overlying relationship to the opening through the bottom wall thereof, and a hub means below the bottom wall of the service panel connected to the end of the conduit, and fastening means extends through the hub means and through the opening in the bottom wall of the service panel and through the adapter plate, whereby the adapter plate and hub means are clamped against opposite sides of the bottom wall of the service panel at the edges of the opening therein to securely clamp the conduit attaching means in adjusted position relative to the bottom wall of the service panel.

OBJECT OF THE INVENTION

It is an object of this invention to provide an electric service panel for underground service installations, wherein an electrical cable for supplying electric power to the service panel extends through a rigid conduit which leads to the service panel from below ground, and wherein laterally adjustable conduit attaching means is provided in the bottom wall of the service panel for adjustment laterally of the bottom wall to compensate for misalignment between the conduit and service panel.

BRIEF DESCRIPTION OF THE DRAWINGS

FIG. 1 is a top perspective view of a typical underground service installation showing the manner in which the service panel is mounted to the frame of the building and in which the cable leads to the service panel from below ground.

FIG. 2 is a view in section taken along line 2—2 of FIG. 1.

FIG. 3 is a view in section taken along line 3—3 of FIG. 1.

FIG. 4 is an enlarged view in section taken along line 4—4 of FIG. 3.

FIG. 5 is an exploded perspective view of the conduit attaching means of the invention.

DETAILED DESCRIPTION OF THE INVENTION

In the drawings, wherein like reference numerals indicate like parts throughout the several views, a building or the like is indicated generally at B and includes a foundation F having a suitable frame thereon comprised of a plurality of vertically extending studs or the like S. An electric service panel P has a front wall 10 with oppositely directed vertically extending flanges 10a and 10b on opposite sides thereof, opposite walls 11 and 12 and a bottom wall 13, and is mounted between a pair of studs S by means of a plurality of suitable fasteners 14, such as screws or the like, extended through the flanges 10a and 10b into the adjacent studs S. The service panel includes a meter M projecting beyond the front wall 10 thereof for exposure outside the building B, whereby it may be readily observed by service personnel.

A suitable electrical supply cable means C extends underground through the foundation F and thence upwardly to the bottom wall 13 of the service panel P, and includes electric cables 15 inside a rigid sheath or conduit 16. Ordinarily, the bottom wall of the service panel has a round opening therein of substantially the same size as the conduit, and the conduit is merely secured to the panel at the opening and the cables are connected with the service line or lines inside the service panel P. However, in the event an underground installation, such as in FIGS. 1 and 2 is used, the conduit 16 must be bent or deformed in order to properly align it relative to the opening in the service panel if the conduit 16 and service panel P are not installed in precise properly aligned relationship.

In accordance with the present invention, the bottom wall 13 has an elongate opening 17 therein, and an adapter plate 18 of substantially rectangular configuration and of substantially larger area than the opening 17 is provided within the service panel against the bottom wall 13 in overlying relationship to the opening 17. The adapter plate 18 has a central opening 19 therethrough, through which the cables extend, and a pair of fastener receiving openings 20 and 21 on opposite sides of the central opening 19 therethrough. A hub means 22 having a central cable receiving opening 23 therethrough and an internally threaded nipple 24 thereon is positioned below the bottom wall 13 and has a width dimension greater than the width of the opening 17 through the bottom wall, such that the opposite flanges 25 and 26 of the hub means 22 overlie the opposite edges of the opening 17. A pair of fastener receptive openings 27 and 28 extend through the opposite ends of the flanges of the hub means 22, and a pair of suitable fasteners, such as bolts 29 and 30, are extended through the openings 27 and 28 in the hub means and upwardly through the opening 17 in bottom wall 13 and through the openings 20 and 21 in the adapter plate 18, and suitable means, such as nuts 31 and 32 or the like, are threaded onto the bolts to securely clamp the adapter plate 18 and hub means 22 in a desired laterally adjusted relationship relative to the opening 17 in the bottom wall 13 of the service panel P.

As seen in FIG. 4, the conduit 16 has an externally threaded end portion which is threadably engaged with the threaded nipple 24 on the hub means.

Thus with the present invention, when the service panel P is installed and with the cable means C installed, if a misalignment exists between the conduit and the normal position of an opening in the bottom wall of the service panel, the conduit attaching means may be adjusted, and because of the elongate opening 17 in the bottom wall of the service panel, the point of attachment of the conduit to the service panel may be adjusted to compensate for the misalignment without requiring any bending or deformation of the conduit itself.

Moreover, the size of the adapter plate 18 is such in relation to the opening 17 that even in all adjusted positions of the conduit attaching means relative to the opening 17, the adapter plate effectively closes the opening 17 to prevent the entry into the service panel of foreign elements.

As this invention may be embodied in several forms without departing from the spirit or essential characteristics thereof, the present embodiment is, therefore, illustrative and not restrictive, since the scope of the invention is defined by the appended claims rather thay by the description preceding them, and all changes that fall within the metes and bounds of the claims or that form their functional as well as conjointly cooperative equivalents are, therefore, intended to be embraced by those claims.

We claim:

1. An electric service panel for underground service installations, wherein an electrical cable means including a cable inside a rigid conduit for supplying electric power to the service panel leads to the service panel from below ground, said service panel having a front wall, opposite side walls and a bottom wall, said bottom wall having an elongate opening therein through which the cable can enter the service panel, conduit attaching means at the bottom wall for receiving and holding the end of the conduit, said conduit attaching means being laterally adjustable relative to the opening in the bottom wall to compensate for misalignment between the conduit and service panel and comprising a rectangular adapter plate disposed inside the service panel against the bottom wall thereof in overlying relationship to the opening through the bottom wall to close the opening, a hub means below the bottom wall, said hub means having flange means thereon engaged against the underside of the bottom wall at the edges of the opening, said adapter plate and hub means having aligned openings therethrough through which the cable can extend, said adapter plate having a size in relation to the size of the opening such that it effectively closes the opening in all adjusted positions of the attaching means, and fastening means extending through said flange means and through said opening and through said adapter plate to securely clamp the adapter plate and hub means on opposite sides of the bottom wall in adjusted position relative to the opening.

* * * * *